United States Patent Office 3,110,742
Patented Nov. 12, 1963

3,110,742
POLYALKYL BENZENE MANUFACTURE
Benjamin W. Howk, West Chester, Pa., assignor to E. I. du Pont de Nemours and Company, Wilmington, Del., a corporation of Delaware
No Drawing. Filed July 20, 1960, Ser. No. 44,016
5 Claims. (Cl. 260—668)

The present invention relates to a process for the preparation of polyalkyl benzenes.

Polyalkyl benzenes, such as xylenes, pseudocumene, mesitylene, and durene, have achieved major importance as starting materials for commercial chemical products. For example, p-xylene is in demand for use in the manufacture of terephthalic acid, a polyethylene terephthalate intermediate. Because the quantity of polyalkyl benzenes which can be economically recovered from petroleum and other sources is not always sufficient to fulfill industrial demands, processes for producing the polyalkyl benzenes from readily available materials are highly desirable.

The halomethylation of alkyl benzenes to give alkyl-substituted benzyl halides is known. For example, the chloromethylation of toluene by means of formaldehyde and hydrogen chloride gives o- and p-methylbenzyl chlorides. Then a replacement of the halogen in the halomethylated alkyl benzene by hydrogen will complete the route of converting a monoalkyl benzene, e.g., toluene, to a polyalkyl benzene, e.g., xylene; or of converting a polyalkyl benzene, e.g., xylene or pseudocumene, to a higher-alkylated polyalkyl benzene, e.g., durene. Experience has shown, however, that effective hydrogenolysis of alkyl-substituted benzyl halides in the liquid phase at room temperature or slightly above may require reaction times of the order of a few hours. In addition to the undesirability of reaction times of this order, such a procedure has a deleterious effect on the catalyst used in the hydrogenolysis and often a catalyst is no longer effective after being used only once. Consequently, high catalyst consumption also becomes a major drawback to such a procedure. On the other hand, the well-known high degree of reactivity of halomethyl compounds at elevated temperatures has the effect of introducing the strong possibility of competing reactions at such temperatures, such reactions producing a severe limitation on the degree of hydrogenolysis which can take place. For example, the benzyl halides are known to produce high-molecular-weight condensation products in the form of tars at elevated temperatures. Furthermore, in the presence of hydrogen and a hydrogenation catalyst, reduction of the benzene ring may also occur. Thus, under the conditions which would ordinarily be necessary to achieve hydrogenolysis of the halides at economically feasible rates, e.g., elevated temperatures, competing reactions would be expected to interfere severely with the desired hydrogenolysis.

It has now been found, however, that polyalkyl benzenes can be prepared quickly and efficiently by reacting an alkyl-substituted benzyl halide with hydrogen in the presence of a hydrogenation catalyst and at a temperature sufficient to maintain the benzyl halide in the vapor state. According to the process of the present invention, a mixture of hydrogen and an alkyl-substituted benzyl halide in vapor form is brought into contact with a hydrogenation catalyst, for example, palladium or platinum, at a temperature sufficiently high to keep the halide in the vapor phase. Generally, this is accomplished by having the temperature in the reactor in the range of 190° to 300° C.

The following examples illustrate the invention.

The reactor for carrying out the vapor-phase reactions described in the examples consists of a glass U-tube, one arm of the U-tube serving as a vaporizing zone and the other arm serving as the reaction zone. Both arms of the U-tube have an inner diameter of 1 inch. Located in the vaporizing zone is a 0.5-inch-deep bed of glass beads which serves to provide greater contact area between the hydrogen and the alkyl-substituted benzyl halide. Located in the reaction zone is a 1-inch-deep catalyst bed, beneath which is a 0.5-inch-deep bed of glass beads. The entire U-tube is surrounded by electrical heating tape, and thermocouples extend into both sides of the tube as a means of temperature measurement.

*Example 1*

A mixture of o- and p-methylbenzyl chlorides, obtained by the chloromethylation of toluene, is introduced in the vaporizing zone of the afore-described glass U-tube at a rate of 0.6 gram per minute, while a stream of dry hydrogen is simultaneously passed into the same zone at a rate of 500 cc. (measured at standard conditions) per minute. The temperature in both arms of the U-tube is maintained at 200° C. The resulting mixture of hot vapors then passes through a catalyst bed consisting of 6.6 grams of 1% palladium-on-charcoal which is located in the reaction zone of the U-tube. After leaving the catalyst bed, the vapors are condensed and found by infrared analysis to consist of a mixture of o- and p-xylenes. The yield of xylenes is 92%.

The catalyst used in this experiment exhibited no loss in catalytic activity after having been employed for the hydrogenolysis of 152 grams of the mixture of o- and p-methylbenzyl chlorides.

*Example 2*

A mixture of o- and p-methylbenzyl bromides is subjected to vapor-phase hydrogenolysis according to the procedure described in Example 1. The product, as shown by infrared analysis, consists of a mixture of o- and p-xylenes.

*Example 3*

A 1/1 mixture (by weight) of xylol and 2,5-bis(chloromethyl)-p-xylene, the latter being obtained by the chloromethylation of p-xylene, is fed into the vaporizing zone of the described glass U-tube at a rate of 0.5 gram per minute, while hydrogen is introduced simultaneously at a rate of 500 cc. (measured at standard conditions) per minute. The vapors then are passed through a catalyst bed of 5% palladium-on-charcoal which is located in the reaction zone of the U-tube. The temperature is maintained at 230° C. in both arms of the tube. The vapors leaving the catalyst bed are condensed and, as determined by infrared analysis, consist of xylol and durene (1,2,4,5-tetramethylbenzene). The yield of durene is 80%.

The following example of the liquid-phase hydrogenolysis of methylbenzyl chloride illustrates the superiority of the vapor-phase process of the present invention over liquid-phase processes, particularly with regard to reaction time and catalyst consumption.

Twenty grams of a mixture of o- and p-methylbenzyl chlorides is agitated in a shaker bomb with 1.5 grams of 1% palladium-on-calcium carbonate under a hydrogen pressure of 50 p.s.i., the temperature being maintained at 25° C. Samples of the reaction mixture analyzed by infrared spectroscopy at frequent time intervals give results as follows:

| Time after start of reaction | o- and p-Xylenes, wt. Percent | Benzyl Chlorides, wt. Percent |
| --- | --- | --- |
| 0.5 hr | 16 | 84 |
| 1.0 hr | 34 | 66 |
| 1.75 hrs | 62 | 38 |
| 2 hrs | 70 | 30 |
| 3 hrs | 90 | 10 |
| 4 hrs | 100 | 0 |

When the foregoing experiment is repeated at 70° C. under otherwise the same conditions, the reaction product after 1 hour consists of 40% by weight of o- and p-xylenes and 60% by weight of benzyl chlorides. There is no change in the reaction mixture after an additional hour, the catalyst having become deactivated.

As is shown in the foregoing examples, the vapor-phase process of the present invention is much superior to liquid-phase processes with respect both to time requirements and catalyst consumption. As is shown in the example describing the liquid-phase process, a 4-hr. reaction time is required to convert o- and p-methylbenzyl chlorides to o- and p-xylenes in the liquid phase at 25° C. Furthermore, at 70° C., the catalyst becomes deactivated and only 40% of the benzyl chlorides is converted to xylenes even after a two-hour period. On the other hand, the present process is rapid and, as shown in Example 1, the catalyst may be used over extended periods without becoming deactivated.

As set out heretofore, the process of the invention is effected at a temperature which is sufficient to maintain the alkyl-substituted benzyl halide in the vapor state. In general, temperatures within the range of 190° to 300° C. are suitable, although temperatures within the range of 200° to 230° C. are preferred. Since even relatively slight temperature elevations led to catalyst deactivation in methods heretofore used, as pointed out above, it is surprising that the hydrogenolysis of alkyl-substituted benzyl halides can be effectively carried out at the temperatures used in the present process.

The means of vaporization of the benzyl halide has little or no effect on the hydrogenolysis reaction provided that the benzyl halide is in the vapor phase and mixed with hydrogen prior to contact with the catalyst. However, to avoid yield loss due to formation of condensation products, it is preferable that the benzyl halide be vaporized as rapidly as possible and in the presence of the hydrogen. This can be achieved by passing the benzyl halide into a stream of hydrogen at a temperature of 190–230° C., preferably over a surface-extending material, for example, glass beads. The vapors leaving the vaporizing zone then pass through the catalyst bed maintained at the reaction temperature, and into a condenser.

As is shown in the foregoing examples, the present process provides a convenient and effective means of obtaining polyalkyl benzenes. The process is particularly suitable for the preparation of di-, tri-, and tetraalkyl benzenes. Inasmuch as the halomethylated polyalkyl benzenes required as the starting materials for obtaining penta- and hexaalkyl benzenes have extremely high boiling points, the present process is less suitable for the preparation of polyalkyl benzenes having more than four alkyl groups.

The examples show that the process of the present invention can be applied to halomethylated monoalkyl benzenes, e.g., methylbenzyl chloride, which is readily obtainable from toluene; as well as to halomethylated polyalkyl benzenes, e.g., bis(chloromethyl)xylenes, which are readily obtainable from the xylene isomers. Further, as is shown in the examples, the process is applicable to alkyl benzenes containing one or a plurality of halomethyl substituents on the aromatic ring. The particular halogen in the halomethyl group or groups has no effect on the course of the reaction although the reaction rate is higher when a more reactive halogen is present in the starting material.

Although a diluent is not required in the present process, inert diluents such as toluene or xylol can be present. Thus, halomethylation reaction products which may contain admixed starting material hydrocarbon, e.g., toluene in toluene halomethylation reaction products, and xylol in xylol halomethylation reaction products, can be used directly in the present process without need of separating the unreacted hydrocarbon.

The noble metal hydrogenation catalysts, e.g., palladium and platinum, have been found to be particularly suitable for use in the present process. The catalyst metal will preferably be supported, e.g., on charcoal or calcium carbonate. As is shown in the examples, the catalyst concentration can be varied and for optimum results will depend in some degree on the particular benzyl halide used and the reaction temperature.

A hydrogen halide is obtained as the by-product in the present process. The hydrogen halide gas may be vented from the reactor and can be used, if desired, in a halomethylation reaction to provide the starting material for the hydrogenolysis.

The process of the present invention preferably is carried out at or below atmospheric pressure. Pressures much above atmospheric may serve to render proper vaporization of the benzyl halide difficult. Operation under vacuum can be used, if desired, to facilitate vaporization of the benzyl halides, particularly the higher-boiling compounds. Pressures in the range of 1 to 1500 mm. Hg are operative.

The invention has been described in detail in the foregoing. However, it will be apparent to those skilled in the art that many variations are possible without departure from the scope of the invention. It is intended, therefore, that the invention be limited only by the following claims.

I claim:

1. A process for the preparation of polyalkyl benzenes having from two to four alkyl substituents which comprises reacting an alkyl-substituted benzyl halide with hydrogen in the presence of a noble metal hydrogenation catalyst supported on charcoal and at a temperature sufficient to maintain said benzyl halide in the vapor state.

2. A process of claim 1 in which the noble metal is palladium.

3. A process of claim 1 in which the polyalkyl benzene is xylene and the benzyl halide is methylbenzyl halide.

4. A process of claim 1 in which the polyalkyl benzene is tetramethyl benzene and the benzyl halide is bis(chloromethyl)xylene.

5. A process of claim 1 in which the alkyl-substituted benzyl halide is vaporized rapidly in the presence of the hydrogen and the mixture thus formed is passed into contact with the noble metal hydrogenation catalyst.

References Cited in the file of this patent

UNITED STATES PATENTS 2,866,828     Crowder et al.     Dec. 30, 1958
2,977,395     Schaeffer et al.     Mar. 28, 1961

OTHER REFERENCES

Brown et al.: "Berichte," 1934, vol. 67, pp. 1094–99. (Copy in Scientific Library.)